Figure 1:
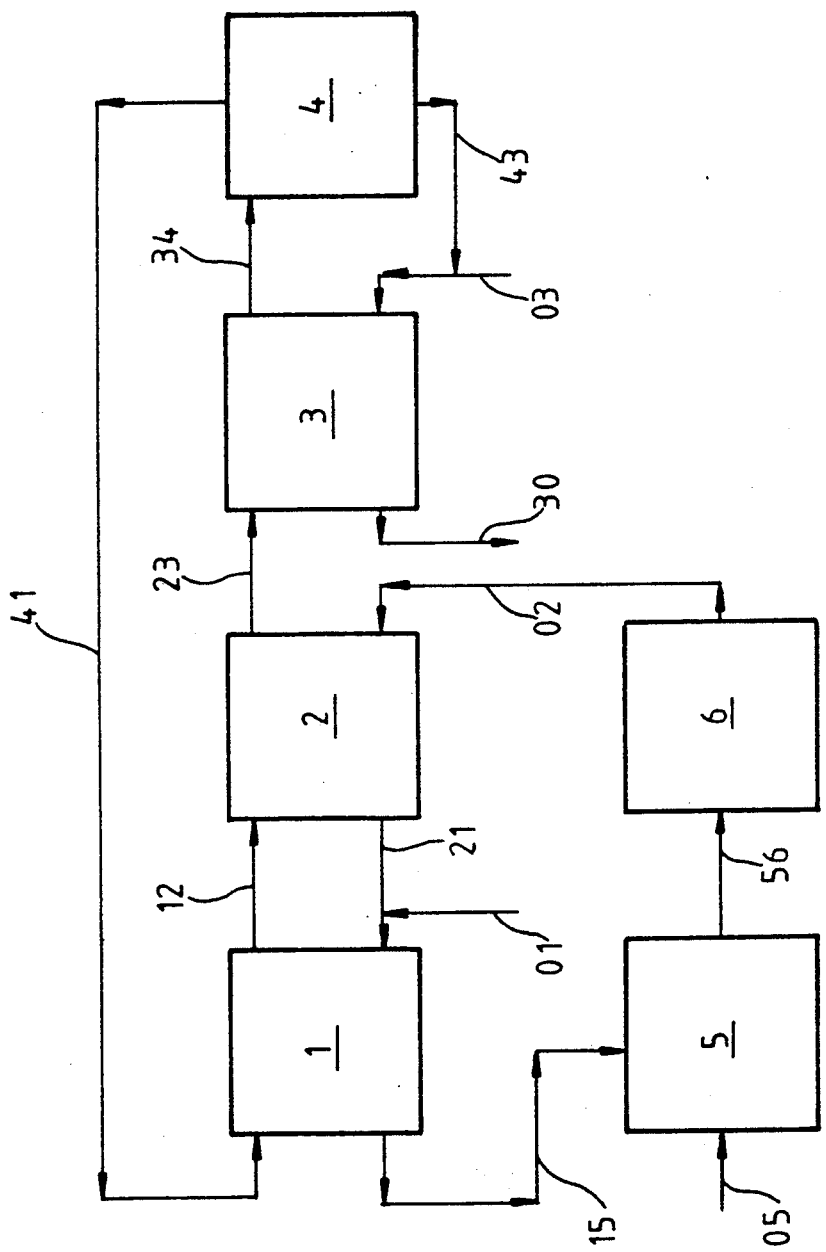

United States Patent [19]

Verbueken et al.

[11] Patent Number: 5,015,456
[45] Date of Patent: May 14, 1991

[54] REMOVAL OF NITRATE AND/OR ORGANIC POLLUTANTS FROM EFFLUENTS

[75] Inventors: Armand Verbueken, Gravenwezel; Domien Sluyts, Stabroek; Roland Putseys, Heide-Kalmthout, all of Belgium

[73] Assignee: Bayer Antwerpen, Antwerp, Belgium

[21] Appl. No.: 513,346

[22] Filed: Apr. 20, 1990

[30] Foreign Application Priority Data

May 9, 1989 [EP] European Pat. Off. ........ 89108278.6

[51] Int. Cl.$^5$ ...................... C01B 21/48; B01D 15/04
[52] U.S. Cl. ...................................... 423/395; 210/638
[58] Field of Search ......................... 423/395; 210/638

[56] References Cited

U.S. PATENT DOCUMENTS 3,966,594 6/1976 Ohkawa et al. .................... 210/638
3,983,222 9/1976 Lehto .
4,169,880 10/1979 Cuer et al. .
4,661,257 4/1987 Kreevoy et al. .................... 210/638
4,872,989 10/1989 Pirotta ................................. 210/638

FOREIGN PATENT DOCUMENTS 0178494 4/1986 European Pat. Off. .
0251426 1/1988 European Pat. Off. .
0256504 2/1988 European Pat. Off. .
0293849 12/1988 European Pat. Off. .
2350962 4/1974 Fed. Rep. of Germany .

Primary Examiner—Gregory A. Heller
Attorney, Agent, or Firm—Sprung Horn Kramer & Woods

[57] ABSTRACT

A continuous process for the removal of at least one of nitrate and organic contaminants from an aqueous effluent, which process comprises subjecting said effluent to extractive liquid ion-exchange with a long-chain alkylamine dissolved in an organic solvent and present in salt form, and reextracting the loaded organic phase with a base, the treated effluent being recycled for reuse.

13 Claims, 1 Drawing Sheet

REMOVAL OF NITRATE AND/OR ORGANIC POLLUTANTS FROM EFFLUENTS

The present invention relates to a continuous process for the removal of nitrate and/or organic contaminants from aqueous effluents.

Effluents containing organic and/or inorganic contaminants have to be purified for ecological and economic reasons. Such effluents are present for instance in the processes for the production of acrylonitrile and caprolactam.

Caprolactam can be produced by the well-known Beckmann rearrangement of cyclohexanone oxime in the presence of oleum, the oxime being prepared from cyclohexanone and hydroxylamine sulfate according to the Raschig process.

The substantial quantities of ammonium sulfate (AS) produced in both reaction steps can be combined and dissolved to saturation, resulting in an effluent containing $(NH_4)_2SO_4$, $NH_4NO_3$, and in addition organic by-products, leading to a residual COD-value of at least 3000 mg $O_2/l$.

For recovery of the salt, the ammonium sulfate is crystallized, leaving a saturated waste solution of ammonium sulfate which has a greater content of the nitrate and organic contaminants due to the concentrating effect of the crystallization.

A continuous discharge of such effluent is needed to maintain safe production and to assure a sufficient salt quality. This effluent exhibits a particularly high salt density. The yields are thus considerably reduced and the disposal of the waste effluent presents serious environmental problems.

Additional pre-treatment of the above waste effluent must necessarily be undertaken to reduce the ammoniacal nitrogen to a concentration level belwo the acceptable limit, before proceeding to, for example, a final biological purification step.

This effluent can be treated with a strong base, in particular sodium hydroxide, to strip off the ammonia. The remaining sodium nitrate and organic components can then be removed by biological treatment.

This procedure does however have the following major disadvantages: (1) the alkaline stripping proves to be extremely expensive, due to the huge amount of alkaline reagent needed, (2) the organic pollutants exert a destabilizing action on the available bio-mass, rendering biological degradation ineffective, and (3) substantial amounts of sulfate, in the form of sodium sulfate, are released to the environment.

Another alternative is to treat the effluent by continuous wet oxidation with oxygen, followed by alkaline stripping of the effluent which is virtually free of organic contaminants. The ammonium nitrate remains unchanged and it is therefore still not possible to recycle the ammonium sulfate waste effluent. The above combination has the advantage of avoiding a conventional bio-treatment of the organic pollutants; however, its operation still requires enormous expense on alkaline stripping.

Replacing sodium hydroxide by lime substantially lowers material costs but poses long-term problems for disposal of the contaminated calcium sulfate precipitate as solid waste.

Another approach is based upon thermal decomposition of the ammonium nitrate content (together with part of the organic fraction) by heating thin layers of the solution to 200° C., as described in Swiss Pat. Nos. CH-A-493,427 and CH-A-544,035.

In EP-A No. 196,597 a similar process is disclosed using wet thermal decomposition, for the treatment of ammonium nitrate-containing waste water obtained in particular during uranium ore processing. Precious metal catalysts are however required in this process.

It is known from previous processes literature concerning ion-exchange processes and metal extraction that nitrate ions can be removed from aqueous solutions by extraction with amine-group-containing material. This material consists of primary, secondary or tertiary amines, suitably in liquid form, and in particular normal or branched long-chain alkylamines which have from 18 to 36 carbon atoms and which are substantially water-insoluble.

The removal of nitrate or nitric acid from aqueous solutions by means of liquid-liquid extraction has previously been described. All the references concerned however relate to specific conditions, with relatively low nitrate and "no" organic contaminants, and to specific uses.

In U.S. Pat. No. 3,983,222 a process is disclosed which uses a secondary amine chloride salt for extraction and neutral potassium chloride as the stripping salt, and which is based upon crystallization of potassium nitrate by cooling the stripping solution. This method, however, leaves substantial chloride in the treated effluent, and produces only moderate extraction yields. A 5-10% solution of the above secondary amine in kerosene is used as the organic extracting phase, measurable losses of extractant unfortunately occurring due to residual water solubility.

In DE-A No. 2,350,962 a similar process for nitrate removal is described, based upon the same secondary amine extractant, which is this time converted into its sulfate salt by means of dilute sulfuric acid. Stripping of the loaded organic phase is carried out using ammonia. All of the added sulfate used to regenerate the amine extractant is lost in the treated waste water. It was also necessary to take additional measures in order to minimize solvent losses.

Both extractive processes apply to acid waste waters from the fertilizer industry and cellulose nitrate production, containing a relatively low level of nitrate below 2%, in particular 0.2%, without any substantial amounts of organic contaminants.

In EP-A No. 251,426 an analogous process again using a secondary amine is outlined for the selective extraction of nitrate ions from solutions containing high concentrations of chloride. The process is said to be particularly suitable for treating salt solutions obtained from the regeneration of anion-exchange resins loaded with nitrate.

According to U.S. Pat. No. 4,169,880 a combined extraction agent is used, comprising a neutral phosphoric ester and a tertiary octylamine, which was found to have a synergistic effect on nitric acid extraction. In this case, the process was designed for the treatment of dilute nitric effluents from nitric acid production plants.

It is the purpose of this invention to provide a process which does not exhibit the aforesaid disadvantages.

It has now surprisingly been found that continuous liquid-liquid extraction based upon ion-exchange with a suitable organic amine salt of the above-mentioned kind makes it possible to remove separately or simultaneously and with high yield both the nitrate and the organic COD-contaminants from effluent saturated with one or several salts, in particular ammonium sulfate, in concentrations between 20 and 40% by weight, without any substantial co-extraction of sulfate, thus making the waste effluent suitable for recycling to the existing industrial plant. The latter aspect is a prerequisite and is an object of the present invention.

Thus, the present invention relates to a continuous process for the removal of both nitrate and/or organic contaminants from aqueous effluents, which process comprises extractive liquid ion-exchange with a long-chain alkylamine dissolved in an organic solvent and present in the form of a salt, and reextraction of the loaded organic phase with a base, after which the treated effluent can be recycled for reuse.

In a preferred embodiment the amine is primary, secondary or tertiary, having from 18 to 36 carbon atoms and being substantially water-insoluble.

Particularly preferred according to the present invention are tertiary amines, such as tri-iso-octylamine (TIOA), which is commercially available under the name Alamine-308 (General Mills Co., now Henkel Corp.) or Hostarex-324 (Hoechst AG).

In practice, to maintain optimum process conditions, the above extraction agent is diluted to a specific concentration with a suitable organic solvent which should have negligible water solubility, low density, low volatility and low viscosity, common examples being kerosene and dodecane.

In the process according to the present invention, an aromatic diluent such as Shellsol AB (Shell Chemical Co.) is preferably used to avoid formation of a third phase in the organic extracting layer, thus making the further addition of modifiers unnecessary. In order to accommodate practical capacity requirements with respect to the amount of organic phase required, the concentration by weight of the amine used in the present process preferably ranges for example from 20% to 60%. However, in principle, the amine concentration may be between 1% and 100%, provided that appropriate flow properties are still conferred on the resulting solvent.

In a preferred embodiment of this invention the effluent in addition contains high concentrations of several salts, in particular ammonium sulfate.

It is also preferable to work up the effluents discharged from caprolactam production plants and/or ammonium sulfate crystallization plants.

The above liquid ion-exchange process exhibits the particular feature that when the organic amine is transformed into its sulfate salt form and subsequently brought into contact with a nitrate- and/or organic compounds-containing solution, the nitrate ions and/or organics are extracted into the organic phase, interchanging with the counter-anions of the original amine salt.

It is common knowledge to those familiar with extraction technology that the organic extractant phase can be regenerated by contacting it with a second aqueous solution containing a specific stripping reagent in a suitable concentration. For this purpose an inorganic salt, acid or base can be used. After separating both liquid phases, the amine extractant can be recycled, either already in a suitable salt form or as the free base. The aqueous solution of reduced volume obtained after stripping contains all of the original nitrate and can be further treated for disposal or conveniently processed into useful by-products, such as nitric acid or chemical fertilizers.

It is important to note that in order to obtain an efficient concomitant extraction of the organic COD-components, even in the presence of considerably higher concentrations of inorganic sulfate ions, the amine extractant should be available in the sulfate form, as is also required for the removal of nitrate. The sulfate salt is preferred over the chloride form, for several reasons:

The yield in the exchange of the nitrate and/or organic contaminants with the sulfate or bisulfate ions of the amine salt is found to be substantially higher;

The extraction of nitrate according to the present process leads to a considerably increased concentration of sulfate in the raffinate, in particular ammonium sulfate in the case of the preferred example, which is conveniently reused after recycling;

Any excess of free sulfuric acid transferred from the process to the aqueous raffinate can be neutralized, for example by ammonia, thus also becoming available for reuse, as mentioned above.

Briefly, the process of the present invention comprises the following steps (FIG. 1):

(i) liquid-liquid extraction of the effluent, containing high concentrations of sulfate, nitrate and/or organic pollutants using the above-preferred sulfated amine extractant, wherein the treated waste effluent is preferably recycled to the ammonium sulfate crystallization plant;

(ii) stripping of the loaded solvent phase with a base, preferably sodium hydroxide or ammonia, whereby a concentrated solution of the original nitrate and/or organic contaminants results, without any substantial content of sulfate;

(iii) removing any entrained aqueous phase from the stripped organic solvent by means of an additional washing or coalescing step, or a combination of both, in order to recycle the free amine extractant;

(iv) regeneration of the organic amine sulfate salt by the introduction of sulfuric acid into the system.

Each of the above steps may be carried out over a wide temperature range, for instance at ambient temperature, in one or several stages, preferably using countercurrent circulation, the different throughputs of the entering streams being carefully matched to a particular flow scheme which has been optimized for the present process.

The inventive process can even successfully be applied to solutions containing high amounts of contaminants. Thus the nitrate concentration can be between 5 and 15% by weight, calculated as $NH_4NO_3$. The organic contaminants can even be removed from solutions having concentrations from 1 to 10% by weight, preferably 1 to 3% by weight. The $(NH_4)_2SO_4$ concentration is preferably between 20 and 40% by weight.

In principle, the amine extractant can be converted to its sulfate form in different ways, by (a) acidifying the effluent to be treated with sufficient sulfuric acid to provide the free acidity needed to sulfate the organic amine;

(b) contacting the recycled solvent with dilute sulfuric acid in a separate section, the dispersion formed being immediately passed to the extraction section without prior separation;

(c) contacting the recycled solvent with sulfuric acid of a suitable concentration in a separate section, preferably by means of recirculation in an internal circuit, thereby allowing the two liquid phases to settle and separate, the regenerated organic phase being passed on further to extraction;

(d) introducing a minimal amount of concentrated sulfuric acid directly into the extraction section near the point where the recycled solvent enters the system.

The latter two methods, in particular (d), represent preferred embodiments of the present invention. In (d), the amount of additional water transferred to the raffinate is minimized, which is of great advantage where subsequent AS-crystallization is carried out by means of evaporation. The loss of sulfate arising from the addition of excess sulfuric acid is also minimized. Moreover, measurable losses of amine extractant to dilute acid solutions are avoided.

Any excess sulfuric acid used transform the amine extractant into its sulfate salt, is recovered from the raffinate by contacting the latter with recycled free amine.

In a preferred embodiment (FIG. 2), an additional acid recovery section has been incorporated to extract residual sulfuric acid from the raffinate by contacting said raffinate with the recycled solvent, thus saving on sulfuric acid costs. Generally speaking, it is clear that, in the treatment of acid effluents, any free acidity of the feed may, at least in part, be conveniently used to regenerate the amine sulfate extractant.

In another preferred embodiment (FIG. 2), the organic solvent leaving the extraction step (i) is first scrubbed with water and/or nitrate ions before entering the actual stripping section. The scrubbing may be regarded as a selective partial stripping of the amine extractant, whereby at least part of the co-extracted organic pollutants are removed into an aqueous sidestream. As the nitrate scrubbing liquid, an aqueous solution of nitrates may be used, which is derived from a subsequent solvent washing section.

In this way, the original nitrate and organic contaminants can be concentrated and at least partly separated into two secondary aqueous effluents of much reduced volume, which may then be further processed in a different manner.

The process according to the present invention is described below in more detail with reference to the accompanying drawings which represent flow charts of two preferred embodiments.

Both embodiments (FIGS. 1,2) relate in particular to the treatment of a salt-rich effluent, heavily contaminated with nitrate and organic by-products, which is discharged from an ammonium sulfate (AS)-crystalization plant in which the main effluent from caprolactam production is worked up. These embodiments are merely illustrative, though preferred, and the invention includes a broader range of applicability.

BRIEF OF DESCRIPTION OF THE DRAWINGS

In FIG. 1, the effluent to be treated is discharged from the existing crystallization unit "6", and is passed to the extraction section "2" through conduit "62". The nitrate and organic contaminants, together with or without a minor amount of sulfate, are removed in multiple stages by contacting with the organic extractant in countercurrent flow. Through conduit "01", concentrated sulfuric acid is introduced into the amine salt formation section "1", which forms an integral part of the total extraction section, to regenerate the amine sulfate extractant, the amine entering unit "1" through conduit "41". The recycled organic extracting phase then proceeds to the above unit "2" through conduit "12".

The aqueous raffinate, leaving unit "1" through conduit "15", constitutes a purified ammonium sulfate effluent, containing no nitrate and a drastically reduced COD-value. This stream, with an increased sulfate concentration, is mixed in vessel "5" with the main effluent from caprolactam production delivered in much higher throughput via conduit "05", and is recycled through conduit "56" to the AS-crystallization unit "6".

The loaded organic solvent phase, removed from the extractor "2" through conduit "23", is re-extracted in the stripping unit "3" by means of a base, such as ammonia or sodium hydroxide, which is introduced through conduit "03". The original nitrate and organic contaminants are concentrated in a secondary aqueous effluent which is withdrawn through conduit "30" to await further treatment. The stripped solvent leaves the above stripping section "3" through conduit "34" and passes through an efficient coalescer "4" for the separation of the entrained aqueous phase, which is reintroduced via conduit "43" with the alkaline stripping solution. An additional coalescer may optionally be inserted in conduit "23", whereby the entrained aqueous phase is passed back to the extraction section "2".

The free amine extractant, leaving unit "4" through conduit "41", is conveniently recycled to the amine salt formation section "1". Its effective concentration in the organic diluent and its relative throughput with respect to the incoming effluent flow should be continuously monitored.

Figure 2:
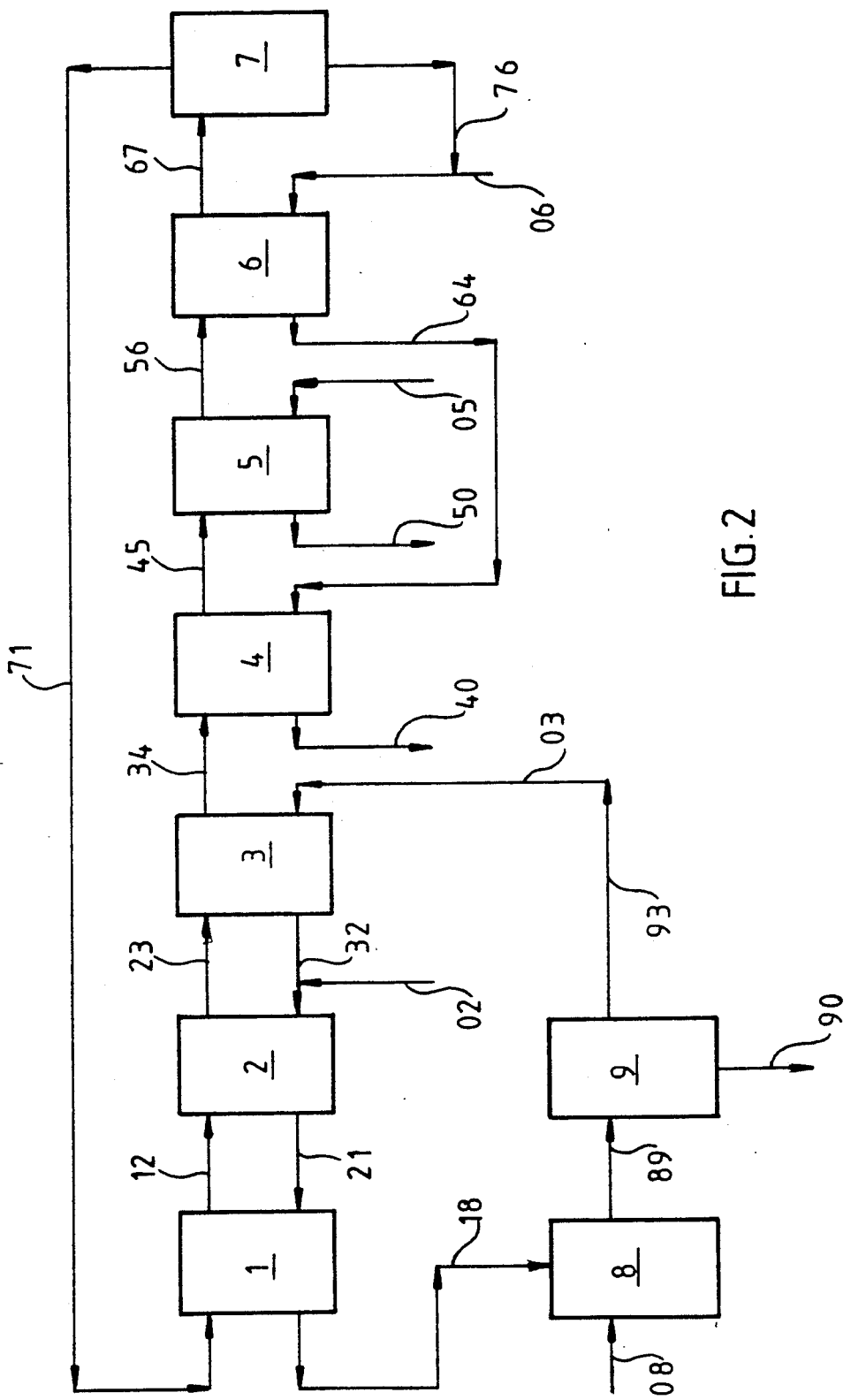

In FIG. 2, an alternative preferred embodiment of the present process is described, incorporating two additional features:

(i) the aqueous raffinate, leaving the amine salt formation section "2" through conduit "21", is contacted in unit "1" with the recycled organic phase, which entered through conduit "71", to extract any residual sulfuric acid. The organic solvent then further proceeds via conduits "12" and "23" to the actual extraction section "3". The purified effluent, withdrawn from the acid recuperation section "1" through conduit "18", shows an increased pH which corresponds with that of the caprolactam effluent, entering the process through conduit "08".

(ii) the loaded organic phase is passed to the scrubbing section "4" via conduit "34", where a partial selective stripping of the co-extracted organic contaminants is carried out by contacting the organic phase with an aqueous solution containing nitrate ions, for example in the form of sodium nitrate, introduced through conduit "64" and derived from the subsequent solvent washing step "6". A secondary effluent of considerably reduced volume, with a higher concentration of the original organic contaminants, is withdrawn through conduit "40" and disposed of by decomposition. The organic solvent, now mainly loaded with nitrate, passes via conduit "45" to the actual stripping section "5", where part of the nitrate present in the organic phase is stripped with the aid of ammonia, introduced through conduit "05", and a concentrated solution of ammonium nitrate leaves through conduit "50". Via conduit "56", the organic phase passes on to the above-mentioned washing section "6", at the same time providing the alkaline nitrates via conduit "64", which are required in the scrubbing section "4". The organic phase, containing the free amine extractant, thereafter passes to the coalescer "7" through conduit "67" and is then recycled to the extraction part of the process.

The process based on liquid-liquid extraction according to the present invention provides a method of great benefit both from an economic and an ecological point of view, which enables removal of both the nitrate and/or the organic pollutants from waste effluents in one and the same operation, leaving a purified stream of ammonium sulfate which can, for example, be profitably recycled to the industrial AS-crystallization unit. The advantages of the recycling offered by the present invention, are clear in view of the substantial reduction in stripping expenditure, the considerable improvement in the AS-production yields, and the simultaneous drastic reduction in the release of sulfate into to the environment.

In addition, the controlled removal of polar organic contaminants from AS-mother liquors and/or effluents, as mentioned above, means that the quality of the resulting ammonium sulfate crystals can be improved.

Other beneficial aspects relate to the considerably reduced volume in which the organic and nitrate contaminants are recovered by the present extractive process, this certainly being of great benefit for their subsequent disposal by incineration or wet oxidation, as well as for any supplementary working-up of the nitrate which may be carried out.

The process according to the present invention can also be employed for the separate ammonium sulfate streams derived from the above-mentioned production of caprolactam according to Raschig and/or other processes as well as for other industrial effluents, in particular those containing a high level of ammonium sulfate.

The process is for example suitable for treating effluent derived from the production of caprolactam, in particular according to the well-known Raschig process, such effluent being saturated with ammonium sulfate and contaminated to a high level by ammonium nitrate and organic by-products, as well as in particular the waste effluent resulting from the repetitive large-scale crystallization to recover the ammonium sulfate for the chemical fertilizer market. The present process provides the opportunity of recycling the above waste effluent back to the existing production facility.

The present invention will now be illustrated below by way of the following examples, which are for illustrative purposes only and are not to be considered as imposing any limitation on the scope of the invention.

EXAMPLE I

In the following series of single batch extractions, ammonium sulfate effluent derived from caprolactam production, having the composition given in Table 1, is contacted at room temperature with an organic extractant phase consisting of 30% of Alamine-336 (tri-n-octylamine) in a Shellsol AB diluent. The amine extractant has previously been converted into its sulfate salt (case A) by equilibration with a solution of dilute sulfuric acid (25%), the relative molar uptake being about 90%. In case B, the above extractant is used as the free amine. In both examples, the molar ratio of nitrate to amine changes from 3:1 to 1:2. The experimental results are shown below in Table 2, demonstrating that an adequate extraction of both the nitrate and organic COD-contaminants is only achieved in case A.

EXAMPLE II

In a continuous liquid-liquid extraction apparatus consisting of a sequence of five mixer-settler units, a flow of 1 l/h of an ammonium sulfate effluent derived from caprolactam production is contacted countercurrently with 4.1 l/h of an organic phase comprising 30% of Alamine-308 in a Shellsol AB diluent. The amine extractant has been converted into its sulfate salt by the continuous addition of 0.1 l/h of concentrated sulfuric acid directly into the extraction unit into which the recycled organic amine is re-introduced. The effluent to be treated has the composition given below in Table 3.

The raffinate withdrawn from the present process contains no residual nitrate and at the same time displays a substantially reduced COD-value, with an at least 80% removal of the organic contaminants. It can therefore readily be reused. The treated effluent also exhibits an increased sulfate concentration (Table 3).

The loaded organic solvent leaving the extraction section is then continuously stripped in three mixer-settler stages using countercurrent circulation of 0.29 l/h of an aqueous solution containing 35% of sodium hydroxide. In this way, about 0.5 l/h of a secondary effluent of neutral to alkaline pH is provided, which contains 20.5% of sodium nitrate. In this highly concentrated solution (1.4 kg/l), the nitrate is present in approximately twice its original concentration. It also contains the major part of the above-mentioned organic contaminants, as is clear from the high COD- and TOC-values (140,000 mg $O_2$/l and 45,300 mg C/l, respectively). A minor fraction of about 10% of the total sulfate input (initial effluent plus additionally added sulfuric acid) is discarded with the sodium nitrate effluent.

EXAMPLE III

In a continuously operating extraction apparatus using 5 sequential mixer-settler units, 1 l/h of Effluent B (see Table 1) is contacted countercurrently with 3.8 l/h of an organic phase comprising 30% of Alamine-308 in a Shellsol AB diluent, the amine extractant having been sulfated by introducing 0.086 l/h of concentrated sulfuric acid. The aqueous raffinate of 0.92 l/h is substantially purified, as can be seen from Table 4, the COD-value being greatly reduced and no residual nitrate being present.

The loaded organic solvent which leaves the extraction part of the process, is scrubbed in four countercurrent mixer-settler stages with an aqueous solution of nitrate ions derived from a subsequent alkaline washing unit. In this way, a secondary effluent "Scrub Out" of 0.24 l/h is provided, containing the major fraction (80%) of the co-extracted organic contaminants, and also a minor part of the extracted nitrate. Table 4 gives the composition of all the outflowing streams with reference to the original effluent.

The organic solvent thereafter proceeds to the actual stripping section, comprising two mixer-settler stages, in which 0.129 l/h of an aqueous solution containing 25% of ammonia is used to re-extract part of the nitrate. In this way, 0.17 l/h of a concentrated solution of ammonium nitrate is provided, which has a substantial concentration of nitrate in relation to the sulfate and organic contaminants (Table 4). This "Strip Out" solution contains more than 75% of the nitrate input and has a considerably reduced volume compared to the original effluent. In Table 5, relative enrichment factors are given to illustrate the separating effect of the previous scrubbing section.

On leaving the above stripping section, the organic solvent is washed in a single mixer-settler stage by about 0.1 l/h of a 30%-NaOH solution, which directly provides the nitrate ions needed for scrubbing. The organic extractant is now available as the free amine and, after passing a supplementary coalescer, the solvent phase is recycled to the extraction section.

EXAMPLE IV

The ammonium sulfate-containing effluents derived from both reaction steps in the production of caprolactam according to the Raschig process have the typical and differing composition shown in Table 6. In this particular case, they are separately concentrated approximately 5-10 times by evaporative crystallization of the ammonium sulfate. The resulting waste effluent either exhibits a high nitrate concentration with only minor organic contamination (Effluent C from Table 7) or is otherwise highly contaminated by organic constituents without substantial amounts of nitrate (Effluent D from Table 7).

In a series of single batch extractions, these two concentrated effluents are contacted at room temperature with an organic extractant phase consisting of 30% of Alamine-308 in a Shellsol AB diluent. The amine extractant has previously been converted into its sulfate salt by equilibration with a solution of dilute sulfuric acid, 0.6 moles of the acid being used per mole of amine. The molar ratio of amine to nitrate (Effluent C) changes from 1:3 to 3:1. For Effluent D, the experimental extractant-to-effluent weight ratio is kept identical with that used for the extraction of Effluent C.

The experimental results are shown in Table 8, demonstrating adequate extraction of the separated nitrate and organic COD-contaminants from the ammonium sulfate waste effluents, without any co-extraction of sulfate.

EXAMPLE V

A synthetic aqueous solution containing 28% of ammonium sulfate and 12% of ammonium nitrate without any organic contamination (Effluent E from Table 7) is extracted by the same organic phase and under the same conditions as used in Example IV.

The molar ratio of amine to nitrate ranges from 1:3 to 2:1. The experimental results are presented in Table 8. They demonstrate a complete extraction of the nitrate contaminants from this particular effluent of high salt concentration.

EXAMPLE VI

In a continuous liquid-liquid extraction apparatus consisting of three mixer-settler units, a stream of 2.5 l/h of an aqueous effluent derived from the production of vulcanization accelerators and loaded with organic COD-contaminants is contacted countercurrently at room temperature with 0.5 l/h of an organic phase comprising 10% of Alamine-308 in a Shellsol AB diluent. The amine extractant has already been converted into its sulfate salt by previous continuous contact with 0.115 l/h of dilute sulfuric acid (10%) in a separate mixer-settler unit into which fresh organic extractant is introduced and from which the exchanged sulfuric acid solution is withdrawn. The aqueous effluent to be treated has the composition shown in Table 9.

The raffinate withdrawn from the extraction section exhibits a substantially reduced COD-and TOC-value (Table 9), without co-extraction of the inorganic ions present in high concentration. As a result, the present process offers the opportunity to by-pass the usual biological treatment.

The loaded organic solvent leaving the extraction section is continuously stripped in two mixer-settler stages using countercurrent contact with 0.095 l/h of an aqueous solution containing 5% of sodium hydroxide. In this way, a conveniently concentrated solution of alkaline pH is provided which contains the major part of the above-mentioned organic contaminants, as is clear from the high COD-value ($>$20,000 mg O2/l).

TABLE 1

| Composition | | Effluent A | Effluent B |
|---|---|---|---|
| $NO_3^-$ | (%) | 8.25–8.79 | 8.0–8.88 |
| $SO_4^{2-}$ | (%) | 21.1 | 11.6 |
| Tot. $NH_3$ | (%) | 10.31 | 7.36 |
| COD | (mg $O_2$/l) | 72360–78100 | 84500–94760 |
| TOC | (mg C/l) | 24050 | 31370 |
| Density | (kg/l) | 1.26 | 1.20 |
| pH | | 3.9 | 3.5 |

TABLE 2

| Molar ratio $NO_3$—$R_3N$ | Raffinate A | | | | Raffinate B | | | |
|---|---|---|---|---|---|---|---|---|
| | $NO_3$— (%) | $SO_4^{2-}$ (%) | COD (mg $O_2$/l) | TOC (mg C/l) | $NO_3$— (%) | $SO_4^{2-}$ (%) | COD (mg $O_2$/l) | TOC (mg C/l) |
| 3:1 | 6.02 | 22.8 | 66100 | 20864 | — | — | — | — |
| 2:1 | 4.49 | 24.4 | 62900 | 19825 | — | — | — | — |
| 3:2 | 3.16 | 25.7 | 60550 | 18572 | — | — | — | — |
| 1:1 | 0.96 | 30.9 | 51000 | 15791 | 8.01 | 13.4 | 87169 | 31800 |
| 4:5 | 0.27 | 31.6 | 40200 | 12593 | 7.66 | 12.3 | 94093 | 30600 |
| 2:3 | 0.16 | 32.2 | 33900 | 10827 | 7.65 | 12.1 | 90427 | 32400 |
| 4:7 | 0.11 | 34.3 | 31500 | 10138 | 7.70 | 12.4 | 91243 | 31300 |
| 1:2 | 0.09 | 36.6 | 29100 | 9338 | 8.07 | 12.9 | 91243 | 31300 |

TABLE 3

| Effluent Composition | | Before Treatment | After Treatment |
|---|---|---|---|
| $NO_3$— | (%) | 8.0–8.93 | $\leq$0.003 |
| $SO_4^{2-}$ | (%) | 19.8 | 32.6 |
| Tot. $NH_3$ | (%) | 10.12 | 10.93 |
| TOC | (mg C/l) | 28500 | 6700 |
| COD | (mg $O_2$/l) | 87130 | 16635 |
| pH | | 3.75 | 1.8 |

TABLE 4

| Composition | $NO_3$— (%) | $SO_4^{2-}$ (%) | TOC (mg C/l) | COD (mg $O_2$/l) | pH |
|---|---|---|---|---|---|
| Effluent | 8 | 11.6 | 31370 | 94760 | 3.5 |
| Raffinate | $\leq$0.003 | 25.8 | 9700 | 27200 | 2 |
| Scrub Out | 7.44 | 9.19 | 76000 | 240000 | 4 |
| Strip Out | 34.9 | 0.82 | 26000 | 80000 | 8 |

TABLE 5

| Separating Effect | $NO_3$—/TOC | Enrichment Factor |
|---|---|---|
| Strip Out (Ex. II) | 3.3:1 | — |
| Scrub Out (Ex. III) | 1:1 | 3.3 (TOC) |

TABLE 5-continued

| Separating Effect | $NO_3^-$/TOC | Enrichment Factor |
|---|---|---|
| Strip Out (Ex. III) | 13.4:1 | 4 ($NO_3^-$) |

TABLE 6

| Composition | Caprolactam effluent I (Oxime synthesis) | | Caprolactam effluent II (Oxime rearrangement) | |
|---|---|---|---|---|
| | Before | After* | Before | After** |
| $NO_3^-$ (%) | .51–.72 | 3.66–4.62 | .004–.1 | .17 |
| $SO_4^{2-}$ (%) | 29.8 | 27.0 | 27.8 | 27.8 |
| COD (mg $O_2$/l) | 232 | 880 | 9112 | 64800 |
| TOC (mg C/l) | 41 | 60 | 2820 | 19700 |
| pH | 7.6 | 4.1 | 5.8 | 5.4 |

Before = Before evaporative crystallization of AS.
After = After evaporative crystallization of AS.
*Effluent C (Table 7)
**Effluent D (Table 7)

TABLE 7

| Composition | Effluent C | Effluent D | Effluent E |
|---|---|---|---|
| $NO_3^-$ (%) | 3.66–4.62 | 0.17 | 9.59 |
| $SO_4^{2-}$ (%) | 27.0 | 27.8 | 20.2 |
| COD (mg $O_2$/l) | 880 | 64800 | — |
| TOC (mg C/l) | 60 | 19700 | — |
| pH | 4.1 | 5.4 | 3.4 |

TABLE 8

| Molar ratio $NO_3^-$ $R_3N$ | Raffinate C | | | Raffinate D (*) | | | | Raffinate E | |
|---|---|---|---|---|---|---|---|---|---|
| | $NO_3^-$ (%) | $SO_4^{2-}$ (%) | TOC (mg C/l) | $NO_3^-$ (%) | $SO_4^{2-}$ (%) | COD (mg $O_2$/l) | TOC (mg C/l) | $NO_3^-$ (%) | $SO_4^{2-}$ (%) |
| 3:1 | 2.37 | 28.9 | 46 | 0.014 | 30.1 | 27552 | 11000 | 7.18 | 24.1 |
| 2:1 | 1.63 | 29.1 | 45 | 0.005 | 30.2 | 19680 | 8730 | 5.57 | 25.5 |
| 3:2 | 0.98 | 30.3 | 51 | 0.005 | 29.2 | 22042 | 7890 | 4.24 | 27.8 |
| 1:1 | 0.07 | 30.3 | 379 | 0.005 | 30.3 | 18499 | 6660 | 1.20 | 30.3 |
| 4:5 | 0.03 | 30.6 | 233 | 0.008 | 30.3 | 16925 | 6280 | 0.10 | 30.5 |
| 2:3 | 0.02 | 31.7 | 134 | 0.010 | 29.6 | 13200 | 5720 | 0.05 | 30.2 |
| 4:7 | 0.02 | 30.2 | 136 | 0.007 | 30.0 | 12400 | 5640 | 0.03 | 30.5 |
| 1:2 | 0.01 | 30.3 | 33 | 0.007 | 30.5 | 8800 | 5710 | 0.02 | 30.7 |
| 1:3 | 0.01 | 29.9 | 29 | 0.009 | 30.7 | 8400 | 5000 | — | — |

*Extractant-to-effluent weight ratio identical with Example C

TABLE 9

| Effluent Composition | | Before Treatment | After Treatment |
|---|---|---|---|
| Cl— | (%) | 1.82 | 1.73 |
| $SO_4^{2-}$ | (%) | 2.0 | 2.28 |
| COD | (mg $O_2$/l) | 4750–5350 | 780 |
| TOC | (mg C/l) | 1123–1150 | 265 |
| pH | | 2.1 | 1.6 |

It will be understood that the specification and examples are illustrative but not limitative of the present invention and that other embodiments within the spirit and scope of the invention will suggest themselves to those skilled in the art.

We claim:

1. A continuous process for the removal of at least one of nitrate and organic contaminants from an aqueous effluent, which comprises subjecting said effluent to extractive liquid ion-exchange with a long-chain alkylamine dissolved in an organic solvent and present in the form of its sulfate salt obtained by addition of sulfuric acid to the amine, and reextracting the loaded organic phase with sodium hydroxide or ammonia, the treated effluent being recycled for reuse.

2. A process according to claim 1, wherein the amine is primary, secondary or tertiary, having from 18 to 36 carbon atoms and being substantially water insoluble.

3. A process according to claim 2, wherein the amine is tertiary.

4. A process according to claims 1, wherein the amine is tri-n-octylamine or tri-isooctylamine.

5. A process according to claim 1, wherein any excess sulfuric acid used to convert the amine extractant into is sulfate salt is recovered from the raffinate by contact with recycled free amine.

6. A process according to claim 1, wherein the organic solvent is a liquid aliphatic or aromatic hydrocarbon.

7. A process according to claim 6, wherein the solvent is aromatic.

8. A process according to claim 1, wherein the effluent in addition contains a 20 to 40% by weight concentration of at least one salt.

9. A process according to claim 1, wherein the effluent in addition contains ammonium sulfate in a concentration of from about 20 to 40% by weight.

10. A process according to claim 1, wherein the effluent is that discharged from at least one of a caprolactam production plant and an ammonium sulfate crystallization plant.

11. A process according to claim 10, wherein the effluent is from an ammonium sulfate crystallization plant and the waste effluent is recycled to the ammonium sulfate crystallization plant.

12. A process according to claim 1, wherein the loaded organic phase is stripped with at least one of water and nitrate ions before the base treatment.

13. A process according to claim 12, wherein the stripping is effected with nitrate ions from a subsequent solvent washing step.

* * * * *